US006241809B1

(12) United States Patent
Hopkins

(10) Patent No.: US 6,241,809 B1
(45) Date of Patent: Jun. 5, 2001

(54) APPARATUS AND METHOD FOR LIQUID SCRUBBING CONTAMINANTS FROM A GAS FLOW

(76) Inventor: Dan Hopkins, 7443 S. Marion St., Littleton, CO (US) 80122

(*) Notice: Subject to any disclaimer, the term of this patent is extended or adjusted under 35 U.S.C. 154(b) by 0 days.

(21) Appl. No.: 09/399,125

(22) Filed: Sep. 20, 1999

(51) Int. Cl.⁷ .............................. B01D 47/06; B01D 45/10
(52) U.S. Cl. .................... 95/216; 55/DIG. 36; 95/217; 95/222; 96/273; 96/325; 96/328; 96/355
(58) Field of Search .................. 55/DIG. 36; 95/216, 95/217, 221, 222; 96/271, 272, 273, 322, 324, 325, 327, 328, 355

(56) References Cited

U.S. PATENT DOCUMENTS

| 3,731,462 | * | 5/1973 | Costarella et al. .............. 96/271 |
| 3,770,061 | * | 11/1973 | Hall ............................ 55/DIG. 36 |
| 3,802,329 | * | 4/1974 | Wright ........................ 55/DIG. 36 |
| 3,865,193 | * | 2/1975 | Hall ............................ 55/DIG. 36 |
| 3,935,188 | | 1/1976 | Karwat . |
| 4,011,802 | | 3/1977 | Molitor et al. . |
| 4,164,399 | * | 8/1979 | Kannapell .................... 96/271 |
| 4,227,895 | * | 10/1980 | Boon ........................... 96/325 |
| 4,281,635 | * | 8/1981 | Gaylord ....................... 55/DIG. 36 |
| 4,351,652 | * | 9/1982 | Wisting ....................... 96/322 |
| 4,784,114 | * | 11/1988 | Muckler et al. .............. 55/DIG. 36 |
| 5,042,457 | * | 8/1991 | Gallagher ..................... 96/328 |
| 5,364,605 | | 11/1994 | Pfeffer et al. . |

FOREIGN PATENT DOCUMENTS

2276334 * 9/1994 (GB) ........................ 55/DIG. 36

OTHER PUBLICATIONS

Brochure, "Moli–tron Enviro–Clean Air Scrubber Section View & Specifications," Moli–tron Company Inc., Aug. 7, 1997.
Brochure, "Moli–tron Enviro–Clean Air Scrubber Sequence of Operation and Sizing Chart," Moli–tron Company Inc., Aug. 7, 1997.
Brochure, "Low energy Scrubbers," p. 4.
Brochure, GDC Filters, pp. 3–4.

* cited by examiner

Primary Examiner—Duane S. Smith
(74) Attorney, Agent, or Firm—John R. Ley; L. Jon Lindsay

(57) ABSTRACT

A scrubber more effectively mixes air or gas with water or a liquid cleaning agent to entrain and thereby clean contaminants from an airflow. An improved baffle-defining structure forces a more complete interaction between the air and water and buffets the mixture into an air/water mixing zone while preventing the water from collecting on an inner surface of the water scrubber and draining down out of the airflow path. A cyclonic, centrifugal dewatering apparatus removes the mist and residual contaminants after the water scrubbing removes most of the contaminants from the air.

45 Claims, 11 Drawing Sheets

APPARATUS AND METHOD FOR LIQUID SCRUBBING CONTAMINANTS FROM A GAS FLOW

This invention relates to cleaning contaminants or undesirable constituents from an airflow or from a gas flow. More particularly, the present invention relates to a new and improved method and apparatus for water or liquid scrubbing contaminants, such as particulate matter and gases, from an air or gas flow. A consequence of the present invention is highly effective air and gas cleaning.

BACKGROUND OF THE INVENTION

Modern society has imposed numerous requirements for filtering contaminants and undesirable constituents from air and gas flows. Environmental concerns and regulations demand that most business and industrial concerns clean any discharged air before the air passes into the ambient environment. One particularly challenging example is the requirement to filter high concentrations of smoke and fat airborne contaminants from the cooking exhaust of restaurants and food preparation facilities. Burning fossil fuels in the generation of electrical power is another, large-scale example. A variety of different filters and cleaning devices have been developed for addressing some of these needs and requirements.

Static high efficiency particle (HEPA) filters are commonly used for relatively small volume cleaning and filtering applications. In conditions with very high contaminant concentrations in the air or in very high flow volume situations, however, HEPA filters are not practical, because HEPA filters will become clogged with particles too rapidly and have to be replaced or serviced too often. HEPA filters are also very expensive.

Scrubbers are a well-known type of cleaning apparatus. Contaminated air or gas passes through a water mist curtain, a waterfall-like flow of water or cleaning liquid, packed beads or electrostatic precipitators and some of the airborne contaminants become entrained in the water or cleaning liquid, or on beads or charged plates of the precipitators, while the partially cleaned air or gas passes from the device. The accumulated contaminants are flushed out periodically, and the scrubber is otherwise cleaned out, typically with hot water and detergent, achieving a level of self-cleaning functionality. Since the contaminants are removed by the cleaning fluid or water and continually washed away, there are no filters or other similar components which need to be replaced or serviced on a periodic basis. Scrubbers are usually preferred for high volume and heavy contamination applications because of their ability to operate continuously without intense maintenance. Scrubbers have also been used as a pre-filter for removing contaminants from an airflow prior to fine-filtering by one or more HEPA filters.

In general, scrubbers have not been fully successful in removing a sufficiently large percentage of airborne contaminants to be practical in certain high contaminant concentration or high volume airflow situations. For example, water scrubbers that have been used to clean the cooking exhaust of a restaurant or the coal dust in the air of a coal mine have had to rely on HEPA or other filters for their primary air cleaning due to the low efficiency of cleaning from the water scrubbing effect. Another difficulty with water or liquid scrubbers is that they introduce relatively large quantities of water or other cleaning liquid into the exiting air or gas flow. Such scrubbers often require a separate filtering or screening section simply to remove the excess moisture or cleaning fluid before it is discharged into the environment. Additionally, electrostatic precipitators can cause fires or explosions.

It is with respect to these and other considerations, that the present invention has evolved.

SUMMARY OF THE INVENTION

One improvement available from the present invention is a scrubber with an improved ability to remove contaminants from the airflow or gas flow caused by enhancing the gas and liquid mixing. Enhancing the gas and liquid mixing causes a larger proportion of the contaminants to be mixed with the cleaning fluid and removed from the air or gas flow. The improved efficiency of the present scrubber makes it possible for the scrubbing function to achieve the primary cleaning action on the air or gas flow, without necessarily having to rely on additional HEPA or other filters.

To achieve the enhanced scrubbing, the scrubber comprises a baffle-defining structure which includes a plurality of vertically spaced and interdigitated deflection plates that define a serpentine-shaped flow passageway through which contaminated gas flows generally upward. A liquid distributor is positioned above each passageway to flow liquid cleaning agent downward through each passageway and onto the deflection plates. The deflection plates are vertically spaced and extend generally horizontally in the passageway. Each deflection plate has a main downward sloping portion and an outer end lip portion extending from the main portion. Vertically consecutive deflection plates in the passageway extend horizontally in opposite directions with respect to one another and interdigitate with one another. The lip portions horizontally overlap the main portions of at least one vertically adjacent deflection plate to form the serpentine passageway which has repeated alternating-direction turns around the lip portions of the deflection plates. The liquid flows off the lip portion of each deflection plate into and through the gas flow turning around the lip portion to mix the gas and the liquid and entrain contaminants in the gas flow with the liquid. Preferably, at least a portion of the liquid flowing from the lip portion of the deflection plate is driven upward from the lip portion with the gas flow and mixed with the gas, preferably in a gas/liquid mixing zone in the passageway between vertically adjacent deflection plates where a vortex motion of gas flow increases the contact of the contaminants with the liquid. The liquid is maintained for a longer time in the airflow path, where the opportunity for contaminant/liquid collisions is greater, which results in a greater removal of the contaminants by the liquid. The high turbulence also enhances the atomization of the liquid drops into many smaller liquid droplets, thereby maximizing the surface area and distribution of the liquid suspended in the airflow path. A greater surface area of the liquid leads to a greater likelihood that contaminants will encounter a liquid surface and become entrained therein or chemically react therewith to remove the contaminants from the gas.

Another improved aspect of the present invention relates to an improved method of liquid scrubbing contaminants from a gas flow flowing generally upward through a passageway while flowing a cleaning agent liquid generally downward through the passageway. The method includes turning the gas flow in the passageway through a serpentine-shaped flow path around exterior lip portions of overlapping deflection plates located in the passageway, flowing the liquid generally off of the lip portions of the deflecting plates, mixing the liquid flowing off of the lip portions in the gas flow turning around the lip portions, and entraining a substantial portion of the contaminants in the liquid. Other preferable aspects of the method involve lifting liquid upward from the lip portion during mixing with the gas flow turning around the lip portions of the deflection plates, preferably into a gas/liquid mixing zone between vertically adjacent deflection plates, and flowing the gas flow in the mixing zone in a vortex motion to increase contact of the contaminants with the liquid. Still other preferable steps include inducing the vortex motion by deflecting a significant portion of the gas flow in the passageway with the shape or configuration of the deflection plate, removing a substantial majority of a liquid mist from the gas flow after the gas flow flows through the serpentine-shaped passageway, whirling the gas flow in a circular motion to force the liquid mist to coalesce into liquid by centrifugal force, and forcing contaminants in the gas flow into the coalesced liquid while the gas flow whirls in the circular motion to entrain additional contaminants in the coalesced liquid.

Other improved features of the scrubber of the present invention involve more efficient mist or water removal following the scrubbing, as well as additional contaminant removal. To achieve these and other comparable improvements, a scrubber module is combined with an efficient liquid removal module. The scrubber module has a flow passageway through which contaminated gas flows generally upward and through which a liquid cleaning agent flows downward by which to entrain contaminants from the gas flow within the liquid. The gas flow exiting the scrubber module contains a considerable mist of liquid. The liquid removal module comprises a cyclone connected to receive the gas flow from the scrubber module which imparts a whirling motion to the gas flow and the resulting centrifugal force causes the liquid mist in the gas flow to coalesce into liquid and drain from the cyclone. Contaminants in the gas flow whirling around are also forced into the liquid. Not only is a highly effective liquid removal function achieved, but further removal of residual contaminants passed through the scrubbing module is achieved, all without moving parts or without the use of a complicated mechanical apparatus which will require continual service. A filter connected to receive the gas flow from the cyclone will not be quickly clogged or impeded in performance because of the relatively high liquid content of the gas flow, as is the case of previous scrubbers. The greater efficiency in removing the residual water or scrubbing liquid requires less continual maintenance of mist removal filters and screens. The operation of the scrubber is greatly simplified, since the filters and screens do not have to be serviced on a highly repetitive basis.

Another improved aspect of the present invention relates to a method for more efficient mist or water removal following the scrubbing and additional contaminant removal. According to this aspect of the present invention, the method involves flowing a gas containing contaminants generally upward through a flow passageway, flowing a cleaning agent liquid generally downward through the passageway to entrain contaminants from the gas flow in the liquid, and removing a liquid mist remaining in the gas flow exiting from the passageway by centrifugal force. Additional preferred features of the method involve whirling the gas flow in a circular motion to centrifugally force the liquid mist to coalesce into liquid, and forcing contaminants in the gas flow into the coalesced liquid while whirling the gas flow in the circular motion.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

DETAILED DESCRIPTION

Figure 1:
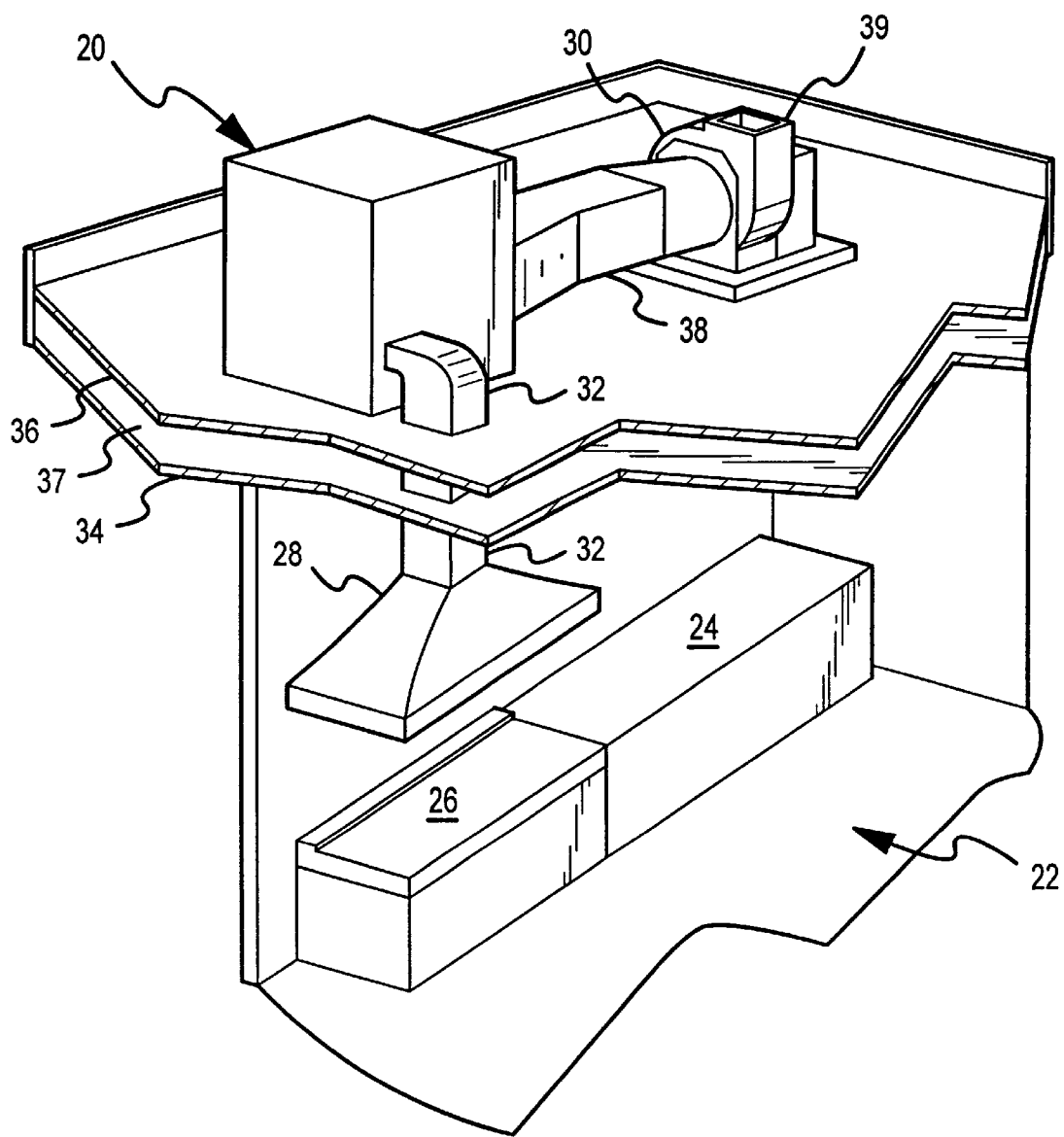
FIG. 1 is a partial perspective view of a restaurant having a food preparation area showing a roof-mounted horizontal scrubber incorporating the present invention.

A scrubber embodying the present invention, referenced 20 in the drawings, is shown in FIG. 1, in a restaurant cooking-exhaust cleaning application. However, the use of the invention is not so limited, but may apply to any situation involving the removal of a variety of different types of contaminants from air or gas. The contaminants may be any airborne particulate matter of solid or liquid substances or may be molecules of gaseous substances. Furthermore, the contaminants may be harmful or benign. For example, in the restaurant cooking-exhaust cleaning application, the contaminants may include grease particles, smoke, volatile organic compounds and/or other molecules or particles creating undesirable odors, smoke and discharge. Other examples of airborne or gas-borne contaminants are sawdust from a sawmill or lumber processing plant, flour from a bakery, coal dust from a mining or power production operation, and ammonia, methanol or ethanol from a manufacturing plant. The scrubber 20 is effective in removing these and other airborne contaminants.

In the cooking-exhaust cleaning application shown in FIG. 1, the restaurant has a food preparation area 22, including counter-top space 24 and a cooking area 26, which may include a stove top, a range, an oven, a wood-burning oven, an open broiler, a deep fryer or other cooking device. A hood 28 receives the cooking exhaust generated from the cooking area 24 in an airflow which is removed from the food preparation area 22 as a result of a blower 30 drawing an airflow from the hood 28 and food preparation area 22 and passing the airflow with the cooking exhaust through the scrubber 20. Duct work 32 directs the airflow and entrained cooking exhaust from the hood 28 through a ceiling 34 and a roof 36 of the restaurant and into the scrubber 20, which is mounted on the roof 36. Alternatively, the scrubber 20 could be mounted in a space 37 between a suspended ceiling 34 and the roof 36, if there is sufficient space, or on the floor of an adjacent room.

The contaminants from the cooking exhaust are cleaned from the air when the airflow passes through the scrubber 20. The cleaned air is passed from the scrubber 20 through duct work 38 to the blower 30, and is discharged from the blower 30 through an exhaust vent 39 to the ambient environment. Alternatively, further duct work (not shown) connected to the exhaust vent 39 of the blower 30 could return the cleaned air through a vent (not shown) into an interior portion of the restaurant, or into the food preparation area 22, or even back into the hood 28, to establish a loop recirculation path for the air from the hood 28 through the scrubber 20 and back again. Since the air is thoroughly cleaned and deodorized by the scrubber 20, it is practical and desirable to return the cleaned air to the environment from which it was removed. Returning the cleaned air has the advantage of preventing a substantial heat loss, because some of the heat content of the removed air is returned to the environment, rather than being lost to the ambient environment. The returned air can make up for the air removed from the environment without having to pull in additional air from the outside environment and then heat or cool that air. In some situations, returning the cleaned air may also cool the interior closed environment. As will be appreciated from the following description, the efficiency in the scrubbing the airflow with water to remove the contaminants causes an evaporative temperature drop.

The blower 30 may be a suction fan, or other type of air or gas pump. Preferably, the blower 30 is a high-static reverse-incline blower, but may be any other type of blower that can produce the necessary static pressure (suction) and airflow rate for the scrubber 20. If the scrubber 20 is mounted in the space 37 between the ceiling 34 and the roof 36, or on the next floor above, and the cleaned air might require venting out of the side of the building, if not returned to the interior of the building, rather than venting from the top of the building. In such cases, the blower 30 may preferably be a tubular fan, or other appropriate blower configuration of low height.

Figure 2:
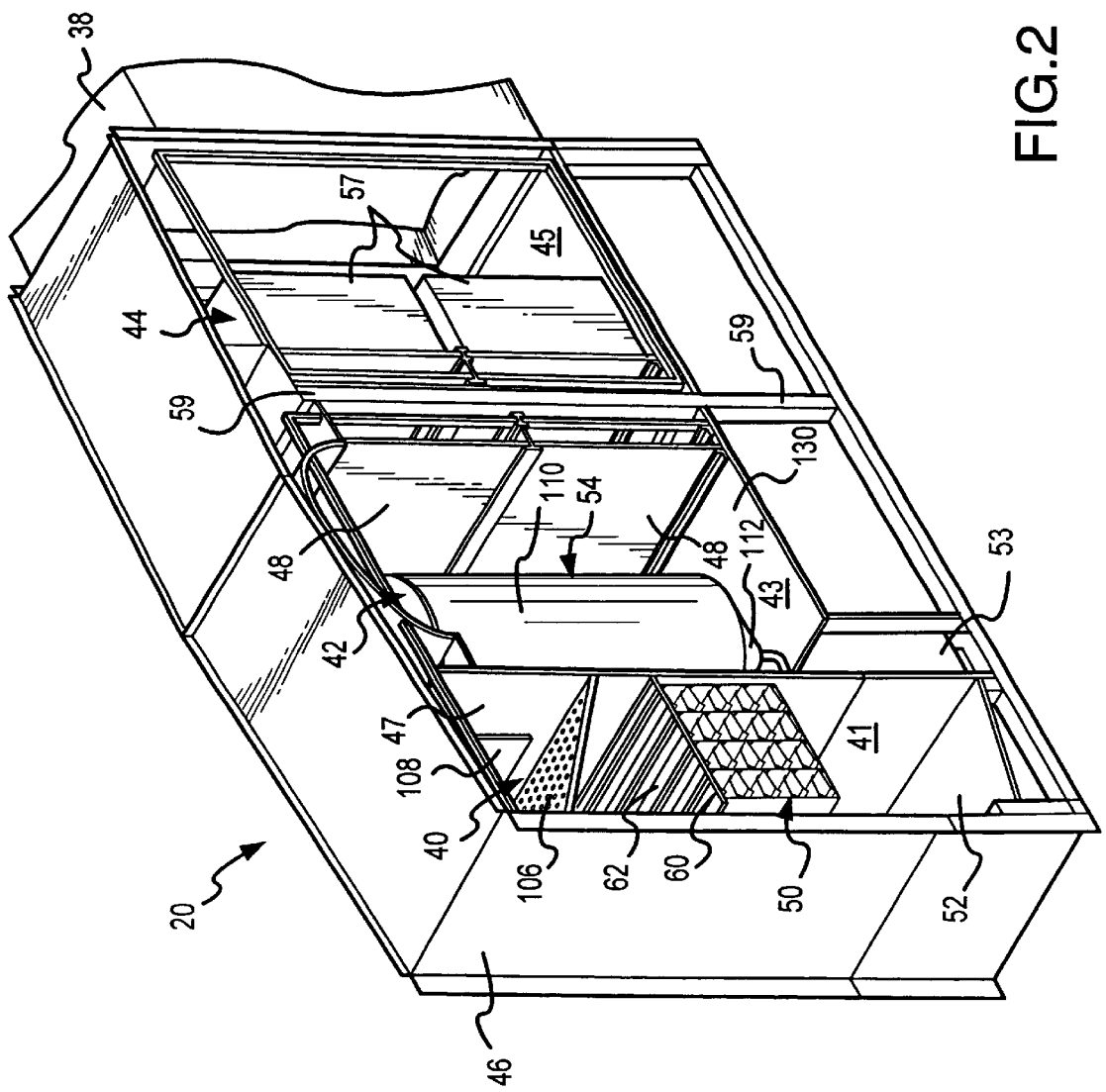
FIG. 2 is an enlarged perspective view of the scrubber shown in FIG. 1 with portions broken away to reveal a scrubbing module, a dewatering module and a filtering module of the scrubber.
Figure 3:
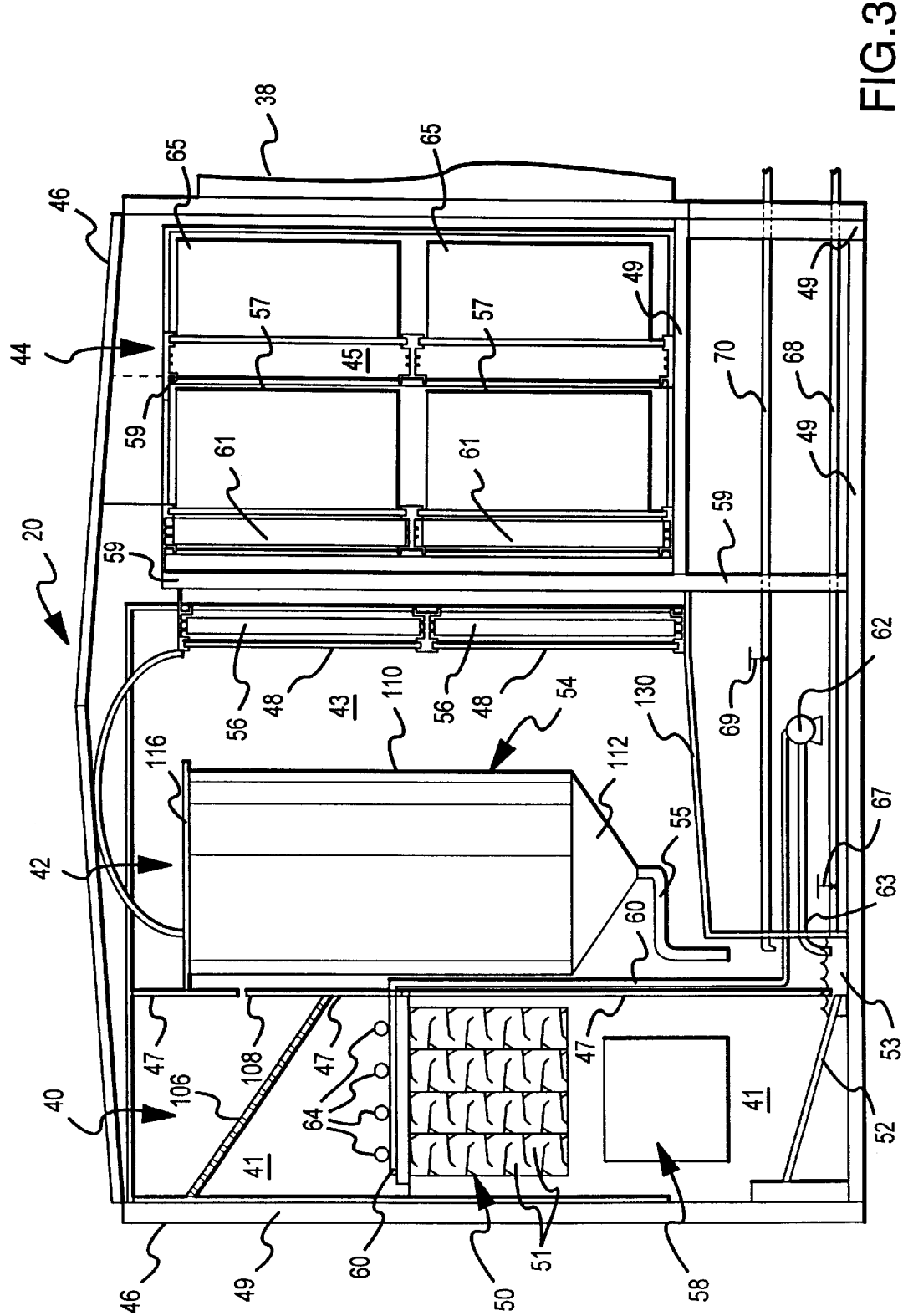
FIG. 3 is an enlarged side elevation view of the scrubber shown in FIG. 2.

The basic components of the scrubber 20 are shown in FIGS. 2 and 3. The scrubber 20 generally includes a scrubbing module 40, a dewatering module 42 and a filtering module 44. The three modules 40, 42 and 44 are contained within a scrubbing compartment 41, a dewatering compartment 43 and a filtering compartment 45, respectively, of a housing 46 for the scrubber 20. The housing 46 includes side panels which define the exterior of the housing 46, and the side panels are removable to allow access to the interior of the scrubber and its components. An interior partition 47 separates the scrubbing compartment 41 from the dewatering compartment 43, and interior diffuser plates 48, such as perforated steel plates, separate the dewatering compartment 43 from the filtering compartment 45 within the housing 46. The scrubber housing 46 has an internal frame structure 49 which supports and positions the modules 40, 42 and 44, the housing side panels, the partition 47 and the diffuser plates 48, as well as the other components of the scrubber 20. A scrubber control and monitoring system (not specifically shown) is also preferably included within the scrubber, along with its sensors, to control and monitor the functions of the scrubber 20. Plumbing to conduct liquid as described below is also included within the scrubber 20.

The scrubbing module 40 includes a baffle-defining structure 50. The baffle structure 50 creates a plurality of serpentine airflow passageways 51 (FIGS. 4 and 6) through which water or other liquid cleaning agent cascades downwards while the contaminated air flows upwards. The resulting air/water mixing (or gas/liquid cleaning agent mixing) in the passageways 51 causes the contaminants in the air to collide with and become entrained within the water, thereby removing the contaminants from the air passing upward out of the baffle structure 50. The entrained contaminants drain with the water onto a sloped drain pan 52 at the bottom of the scrubbing module 40, below the baffle structure 50. The water and entrained contaminants flow along the drain pan 52 and into a drain well 53. The configuration of the baffle structure 50 enhances the mixture of the airflow and water and the atomization of the water into droplets, thereby improving the removal of contaminants from the airflow. The airflow in the passageways 51 continues to the upper portion of the scrubbing compartment 41, above the baffle-defining structure 50, where the airflow passes through a diffuser 106 and is conducted to the dewatering module 42.

The dewatering, or liquid removal, module 42 receives the airflow discharged from the scrubbing module 40 and removes liquid mist and additional contaminants. The dewatering module 42 comprises a cyclone 54. The airflow discharged from the scrubbing module 40 into the cyclone 54 commences whirling at a relatively high speed, centrifugally forcing the water droplets and any remaining airborne contaminants to the outside of the cyclone 54. The small water droplets coalesce into larger amounts of liquid water and entrain contaminant particles forced to the outside of the cyclone 54. The water and entrained contaminants drain from the bottom of the cyclone 54 in a water exit conduit 55 which discharges into the drain well 53. The cleaned and dewatered air exits from the top of the cyclone 54 and is diffused by the diffuser plates 48 as it is routed from the dewatering compartment 43 for even distribution to the filtering module 44.

The filtering module 44 includes one or more mesh-like moisture filters or mist eliminators 56 for removing a portion of any remaining moisture droplets, one or more pre-filters 61 for removing any remaining large particles, one or more high efficiency filters 57 (such as HEPA, DOP or BAG filters) for removing a portion of any additional fine particles, and one or more optional "carbon" filters 65 (such as potassium permanganate filters) for removing a portion of any remaining odors or chemicals. The various filters 56, 57, 61, and 65 are connected to the support frame structure 59 in the filtering compartment 45. The filters 56, 57, 61, and 65 remove essentially all of the remaining residual moisture and any remaining contaminates from the airflow before it is conducted through the duct work 38 to the blower 30 (FIG. 1). Because of the relatively high efficiency of the scrubbing module 40 and the dewatering module 42, both in removing contaminants and moisture, very little moisture or contaminants remain to be caught in the filters 56, 57, 61, and 65 of the filtering module 44, thereby substantially reducing the frequency for changing or servicing the filters 56, 57, 61, and 65.

The scrubbing module 40 of the scrubber 20 is described in more detail with reference to FIGS. 2–7. The airflow from the hood 28 is supplied through the duct work 32 (FIG. 1) to the scrubber 20 through an inlet 58 (FIG. 3) on a side panel of the housing 46, or through some other convenient access in the housing 46 into the scrubbing compartment 41 below the baffle structure 50 and above the drain pan 52. The generally vertically-oriented serpentine passageways 51 in the baffle structure 50 permit the air to flow upwardly through the baffle structure into a space in the scrubbing compartment 41 above the baffle structure 50.

Water or other cleaning liquid is distributed to the top of the baffle structure 50 through a pipe 60 which extends from a recirculating pump 62 (FIG. 3) having an inlet 63 which is connected to the drain well 53. The pipe 60 is connected to an open manifold distributor or closed tubing distributor 64 which extends above the passageways 51 in the baffle-defining structure 50. Although not shown, additional distributors 64 may be positioned along the length of the passageways 51 within the baffle structure 50 to assure an adequate supply of water or other cleaning fluid is available throughout the entire length of the passageways 51. Nozzles 66 (FIGS. 4 and 6), jets or openings spray or distribute the water downwards across the full dimension of the passageways 51 (perpendicular to the view shown in FIGS. 4 and 6). The recirculating pump 62 pumps the water from the drain well 53 and supplies it to the pipe 60 which is connected to the manifold pipes 64 located at the top of the baffle structure 50. The water which drains downward through the passageways 51 of the baffle structure 50 falls onto the drain pan 52. The drain pan 52 slopes toward the drain well 53 and the pump 62. The partition 47 divides space above the drain pan 52 in the scrubbing compartment 41 from the drain well 53 in the dewatering and air diffusing compartment 43, although a number of drain holes (not shown) are formed in the partition 47 at the level of the drain pan 52 to allow water and contaminants to drain from the pan 52 into the well 53. The drain holes in the partition 47 are below the water level of the drain well 53 so as to confine the substantial majority of the entering airflow in the scrubbing compartment 41 and cause the airflow to pass upwards through passageways 51 in the baffle structure 50.

The water drained into the well 53 is re-circulated from the drain well 53 by the pump 62 to the scrubbing module 40. Some portion of the solid contaminants may settle to the bottom in the drain well 53 and are not recirculated with the water from the top of the drain well 53. When the amount of contaminants entrained in the water becomes excessive, the scrubber will be flushed, either automatically by the control system or under manual control, to rinse out the contaminant buildup. Cleaning the scrubber is accomplished by opening a valve 67 on a drain pipe 68 (FIG. 3), and draining the water from the drain well 53. Simultaneously, or thereafter, a valve 69 on a water supply pipe 70 is opened, and the water in the drain well 53 is replaced with fresh water. The settled contaminants are flushed from the scrubber with the water drained from the drain well 53.

Alternatively, the scrubber module need not recirculate the water. Instead, the water could be delivered directly from the supply pipe 70 to the pipe 60 and into the manifold distributor 64, and the water collected from the drain well 53 would be drained through the drain pipe 68. The drain pipe 68 preferably includes a trap (not shown) to cause the drain pipe 68 to siphon the water out of the drain well 53 if the amount of water in the drain well 53 exceeds a predetermined level. Furthermore, because of water evaporation into the airflow in the scrubbing module 40, additional water may need to be added from time to time, by opening the water supply valve 69. The addition of the replenishing water may be accomplished either automatically by the control system or manually.

To assist in rinsing the baffle structure 50, a hot water delivery pipe (not shown) may be connected to spray hot water directly into the baffle structure 50. One or more chemical liquid cleaning agents my also be connected to periodically deliver liquid cleaning agent to the water used in the scrubbing module 40 or as the entire cleaning liquid used in the scrubbing module 40. In the event that corrosive chemicals need to be removed from the airflow, or the cleaning agent is corrosive, the interior surfaces of the airflow path in the scrubber should be coated or lined with an appropriate non-corrosive or non-reactive lining material.

Figure 4:
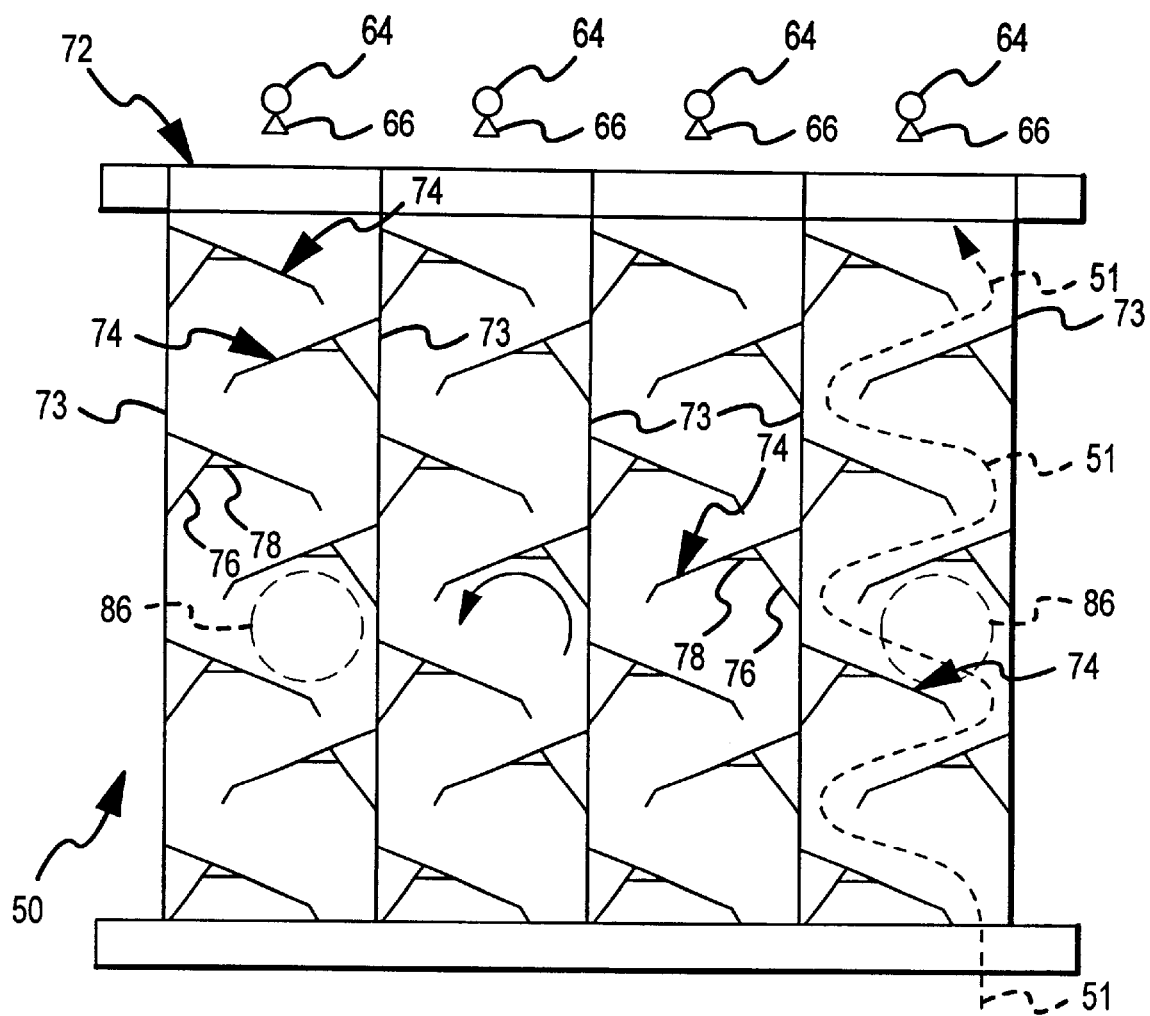
FIG. 4 is an enlarged side elevation view of a baffle-defining structure of the scrubbing module of the scrubber shown in FIGS. 2 and 3.
Figure 5:
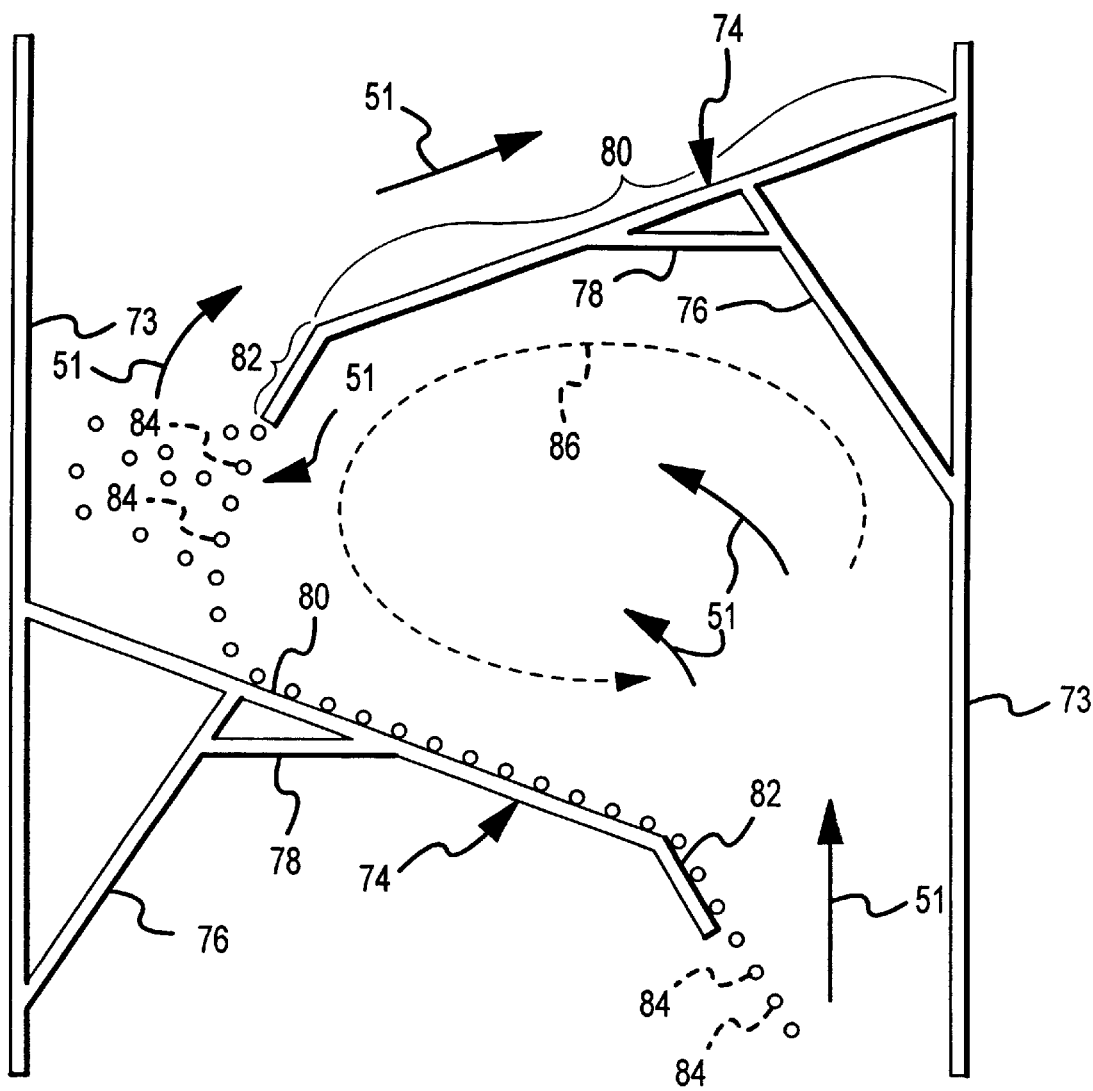
FIG. 5 is a further enlarged partial view of a portion of FIG. 4, illustrating flow turbulence and cleaning effects from the baffle-defining structure of the scrubbing module shown in FIG. 4.

More details of one embodiment 72 the baffle structure 50 are generally shown in FIGS. 4 and 5. The baffle structure embodiment 72 has multiple vertical sidewall plates 73 which are horizontally spaced apart from one another, which extend vertically from the top to the bottom of the baffle structure 72 and which extend horizontally (in a depth sense, perpendicular, as shown in FIG. 4) across the baffle structure embodiment 72. The sidewall plates 73 thereby divide the baffle structure embodiment 72 into the airflow passageways 51.

Attached to each sidewall plate 72 at vertically spaced locations are deflection plates 74. The deflection plates 74 are positioned on the sidewall plates 73 so that one deflection plate 74 from one sidewall plate 73 projects into the space between two other deflection plates 74 attached to the other sidewall plate 73. Arranged in this manner, the deflection plates 74 overlap, causing an interdigitated arrangement of the deflection plates. This interdigitated arrangement causes the serpentine shaped passageways 51 within the vertical space bounded by each pair of horizontally adjacent sidewall plates 73. Lower support brackets 76 and mid support brackets 78 strengthen and maintain the rigidity of the deflection plates 74 as well as help define the passageways 51. The deflection plates 74, support brackets 76 and 78 are connected to one another and to the sidewall plates 73 in a conventional manner, such as by welding in the case of metal or by an adhesive in the case of non-metallic material.

The major portion 80 of each deflection plate 74 is sloped downward at a low or moderate slope, such as about a 15 to 45 degree angle from the horizontal. An outer lip portion 82 of each deflection plate 74 is considerably shorter than the major portion 80 and is sloped downwards from the horizontal at a substantially greater angle, such as greater than 45 degrees.

Configured in the manner described, the interdigitated deflection plates 74 are substantially overlapped (about 51–80% overlapped). The relatively high degree of overlap causes the passageways 51 to be considerably serpentine. As a result, a relatively high degree of horizontal flow reversal occurs in the serpentine passageways 51 and causes improved interaction of the ascending air flow and descending water. The water and airflow cannot avoid interaction and are forced into better mixing which results in improved contaminant removal, as is better understood by reference to FIG. 5.

Water which drains down from above accumulates on the top surfaces of the major portions 80 of the deflection plates 74 and drains off of the lip portions 82 where the water falls into the air flowing upwards through the passageways 51. Because of the complete overlap of the interdigitated deflection plates 74, the air flow must pass through a waterfall like curtain of water falling from each lip portion 82, as shown at 84. Thus, it is not possible for the flowing air to escape contact with the water delivered from the lip portion 82 of each deflection plate 74, as would be the case if the deflection plates did not overlap.

An enhanced air/water mixing zone represented at 86 exists under each deflection plate 74, lower support bracket 76 and the mid support bracket 78, and above the next lower deflection plate 74. The underside surfaces of the lip portion 82, the exposed major portion 80, the lower support bracket 76 and the mid support bracket 78 deflect air and water that are flowing upwards generally in the rotational path represented at 86. The rotational path represented at 86 generally circumscribes and defines the enhanced air/water mixing zone. The lip portion 82, in particular, deflects the upward flowing air/water mixture back into the air/water mixing zone 86. The circulatory nature of the air flow in the mixing zone 86 suspends a considerable amount of water in a vortex, thus increasing the time that the water spends suspended in the air/water mixing zone 86 and maximizing the opportunity for contaminants to collide with and become entrained in or chemically react with the water.

The narrowness of the passageway 51 between the lip portion 82 and the sidewall plates 73 causes an acceleration of the airflow in this region. Thus, as the water reaches the lip portion 82 of the deflection plate, the accelerating air causes the some of the water in the waterfall-like curtain 84 to be buffeted upwards into the air/water mixing zone 86, rather than fall onto the next lower deflection plate. The relatively steep downward slope of the lip portion 82 of each deflection plate minimizes any surface tension adhesion of the water to the bottom of the deflection plate to inhibit any adhering water from moving up on the underside of the lip portion 82 against the force of the overall airflow in the passageway 51 and against the forced from the circulatory vortex in the mixing zone 86. The rapid airflow at the end of the lip portions 82 also breaks the water drops in the waterfall-like curtain 84 into smaller droplets, thus increasing the surface area of the water droplets and finely dispersing the droplets to enhance the opportunity for collisions of the water droplets and the contaminants. The widening of the passageway 51 in the areas of the mixing zone 86 beyond (in the airflow direction) the lip portions 82 of the deflection plates 74 assists in suspending the moisture in the mixing zone 86.

The configuration of the deflection plates 74 and the flow reversals in the serpentine passageway 51 increase the turbulence in the airflow to enhance water droplet dispersion and to prevent the water from colliding with and draining down any of the surfaces in the passageways 51. Many smaller turbulent areas are also created in the passageways 51, forcing the water to mix with the air to provide more opportunities for contaminant removal.

Figure 6:
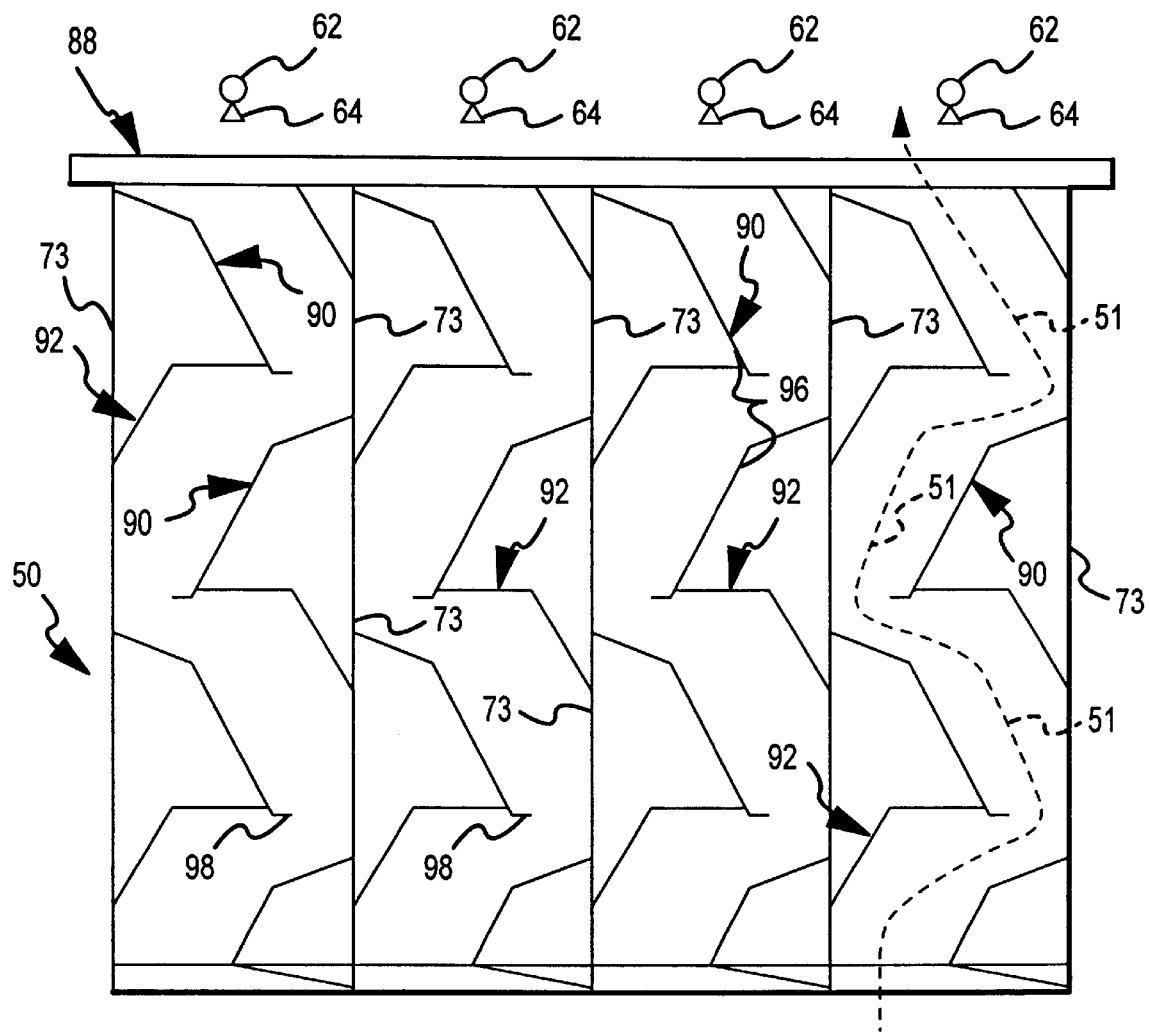
FIG. 6 is a side elevation view of an alternative configuration of the baffle-defining structure of the scrubbing module shown in FIG. 4.
Figure 7:
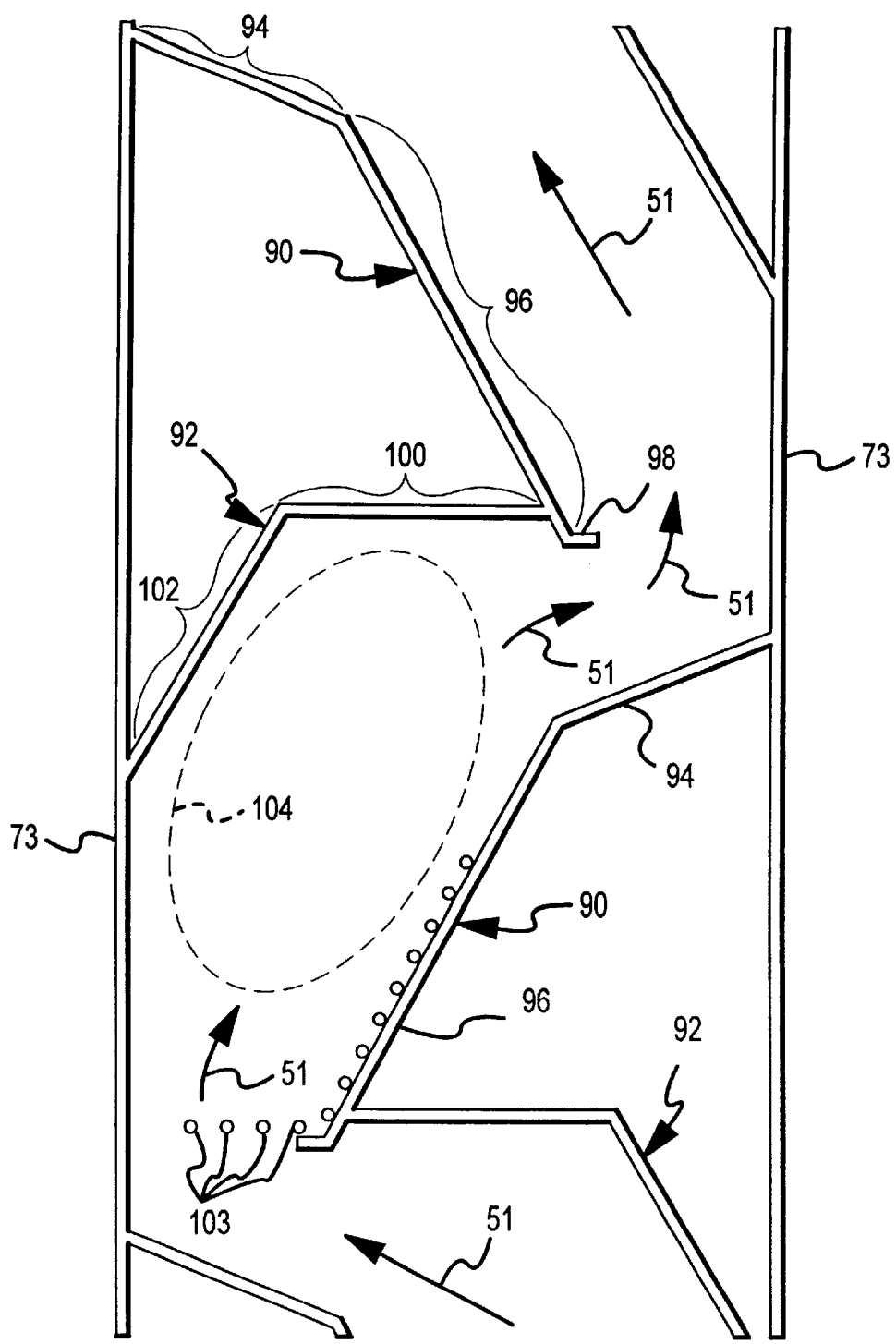
FIG. 7 is an enlarged partial view of a portion of FIG. 6, illustrating flow turbulence and cleaning effects from the scrubbing module shown in FIG. 6.

The airflow rate also contributes to the turbulence and air/water mixing efficiency in the passageway 51, since adjustment of the airflow rate will cause more buffeting of the water into the air/water mixing zone 86 and more atomization of the water droplets. Also, the slopes of the major and lip portions 80 and 82, respectively, may be chosen to prevent the water which lands on the top of the deflection plates 74 from draining too rapidly off the lip portion of the deflection plate 74, so that the water cannot fall quickly through the airflow without being buffeted back up into the air/water mixing zone 86.

An alternative embodiment 88 of the baffle-defining structure 50 is shown in FIGS. 6 and 7. The baffle structure embodiment 88 is similar to that embodiment 72 shown in FIGS. 4 and 5, except for the configuration of deflection plates 90 which are employed in the embodiment 88, The configuration of the deflection plates 90 and the resulting shape of the flow passageway 51 are particularly well suited for handling high volume airflows through the baffle-defining structure 50. The deflection plates 90 project from the vertical sidewall plates 73 into each passageway 51, are vertically spaced from one another in each passageway 51, and interdigitate with one another in each passageway 51, in a manner similar to that previously described. A lower support bracket 92 connects to the deflection plate 90 and extends to the sidewall plate 73 to help define the passageway 51. Air flows generally upwards through passageways 51 and water flows generally downwards through passageways 51 while draining onto and being entrained in the airflow shaped by the deflection plates 90.

Each deflection plate 90 includes a medium sized and downward angled upper portion 94, a largest sized and more steeply downwardly angled middle portion 96, and a smallest sized and horizontally extending outermost lip portion 98. Each support bracket 92 includes a generally horizontally extending outer portion 100 which connects at its outer end to the middle portion 96 slightly above the lip portion 98, and a relatively steeply inclined inner portion 102 which connects to the sidewall plate 73 and to the outer portion 100. The inner portion 102 extends at an inclination angle which is approximately parallel to the angle of the middle portion 96 of the deflection plate 90. The outer portion 100 extends substantially horizontally at a converging angle toward the upper portion 94 of the deflection plate 90 which is located slightly below and horizontally displaced from the outer portion 100. The deflection plates 90 and the support brackets 92 are connected to one another and to the sidewall plates 73 in a conventional manner, such as by welding in the case of metal or by an adhesive in the case of non-metallic material.

Because of the parallel relationship of the portions 96 and 102, a uniform cross section of the flow passageway 51 exists between these portions, and the flow through the portion of the passageway between these portions is more or less constant, except for turbulence induced upstream of this location. However, the converging nature of the portions 94 and 100 continually reduce the cross sectional size of the passageway, causing the airflow rate therethrough to increase. The lip portion 98 projects into this portion of the flow passageway, which further reduces the size, and increases the flow rate. The slope of the middle portions 96 of the deflection plate 90 is high enough to cause water draining down onto the portion 96 to accelerate and shoot out almost horizontally from the horizontal lip portion 98 as shown at 103 (FIG. 7) into the increased-velocity airflow adjacent the lip portion 98 in the passageway 51. Because the passageway is reduced in size between the lip portion 98 and the sidewall plates 73, almost all of the water at 103 is buffeted upwards into an air/water mixing zone 104 above the lip portion 98 in the constant cross-section region between the portions 96 and 102.

Since the higher airflow rate is sufficient to buffet almost all of the water at 103 into the air/water mixing zone 104, the baffle structure embodiment 88 shown in FIGS. 6 and 7 is not as dependent on a need to maintain the air and water in a major vortex 84 (FIGS. 4 and 5) to prevent the water from colliding with and draining down a side surface. Instead, any water that does collide with and drain down a side surface of the passageway 51 is quickly drained down to and directed entirely off of the lip portion 98 at 103, where the airflow returns the water to the air/water mixing zone 104, maximizing the time that the water spends suspended in the air and maximizing the potential for contaminants to be removed by the water particles. Because there is no need for the vortex mixing zone 86 (FIGS. 4 and 5) the airflow and volume handling of the baffle-defining structure embodiment 88 shown in FIGS. 6 and 7 is enhanced. In general, the baffle-defining structure embodiment 88 shown in FIGS. 6 and 7 obtains all of the previously described advantages of the baffle-defining structure described in FIGS. 4 and 5, at a higher flow volume.

The embodiments 72 and 88 of the baffle structure 50 solve a problem with previous water scrubbers which do not mix the water and air well enough to give the contaminants sufficient opportunity to collide with and become entrained within the water. In some previous scrubbers, the water does not sufficiently curtain the entire airflow pathway, so there are regions where the contaminated airflow avoids contact with the water altogether. In other cases, the airflow deflects the water mist curtain, instead of mixing with it, allowing the airflow to avoid contact with the water. In still other cases, the water flows quickly through the spray mist without maximizing mixing of the air and water. In each of these cases, the combination of effects from the airflow and water flow do not optimize the mixing of the air and water and do not provide the greatest chances for the contaminants to be removed from the air.

The embodiments 72 and 88 cause the water to flow directly into the airflow passageways 51 as the liquid flows off the lip portions 82 and 98 of the deflection plates 74 and 90, as shown in FIGS. 5 and 7 respectively. The airflow buffets the water upward to cause air/liquid mixing zones whereby contaminants collide with liquid droplets and become entrained therein or chemically react therewith. The considerable overlap of the deflection plates 74 and 90 causes flow reversals and ensures that the liquid must interact with the airflow, rather than drain down the side walls, as is a problem in previous liquid scrubbers. Each deflection plate 74 and 90 slopes downward a sufficient degree to launch the liquid droplets into the airstream, rather than to allow the liquid droplets to adhere to the sidewalls. The deflection plates 74 and 90 are supported by underside brackets 76, 78 and 92 which further assist in defining the vortex mixing zone 86 and the mixing zone 104, shown in FIGS. 5 and 7, respectively, for better mixing of the liquid and the airflow. The airflow rate, or velocity, is selected to maintain an enhanced amount of liquid in the air/liquid mixing zone, which again maximizes the opportunity for contaminant entrainment in the liquid.

The airflow and entrained water which passes upward from the baffle-defining structure 50 contacts an angled perforated plate 106, as shown in FIGS. 2 and 3. The perforated plate 106 serves as a gross water separating element in the airflow exiting the scrubbing module 40 before the air flows into the dewatering module 42 The perforated plate 106 permits the airflow to pass therethrough, while evening out its distribution. The air flowing out of the top of the baffle structure 50 has a considerable airborne water content, and the perforated plate 106 removes some of the larger water droplets. The droplets carried in the air impact the perforated plate and coalesce or collect into larger drops on the underside of the perforated plate 106. The collected water drains from the perforated plate 106 onto the partition 47 and from there drains back down through the baffle structure 50 to the drain pan 52. After the air passes through the perforated plate 106, it passes through a rectangular hole 108 in the partition 47 which separates the airflow outlet of the scrubbing module 40 from the airflow inlet of the dewatering module 42.

More details of the dewatering module 42 are shown in FIGS. 2, 3, 8, 9 and 10. The cyclone 54 of the dewatering module 42 is basically of a conventional configuration and includes a generally cylindrically-shaped sidewall 110. A generally conical shaped bottom portion 112 is connected to the sidewall 110, and the relatively small water exit conduit 54 leads from the bottommost or pointed end of the conical bottom portion 112. A disc-shaped top end 116 is connected to the sidewall 110. A relatively large air exit conduit 118 extends through the top end 116. The air exit conduit 118 is axially positioned concentrically with respect to the cylindrical sidewall 110 and extends the length of the cylindrical sidewall from the top end 116 down into the conical bottom end portion 112. A lower end 120 (FIG. 9) of the air exit conduit 118 extends into the conical end portion 112 and is somewhat reduced in diameter and is spaced from the conical bottom portion. The air exit conduit 118 is held in position by its connection to the top end 116 and by braces (not shown) between the lower end 120 of the conduit 118 and the conical bottom end portion 112.

Figure 8:
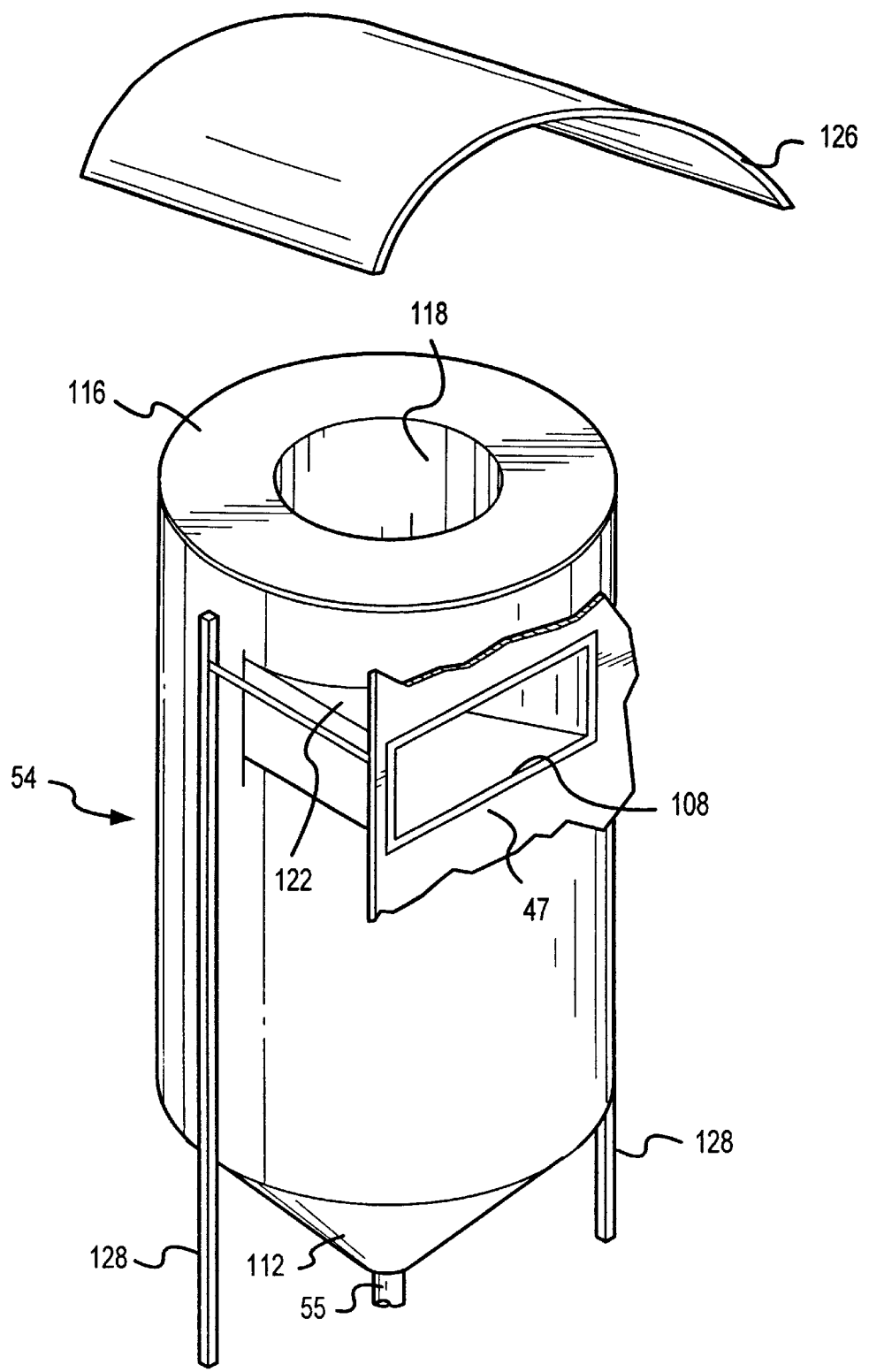
FIG. 8 is a perspective and exploded view of a cyclone of the dewatering module of the scrubber shown in FIGS. 2 and 3, with portions also broken out for clarity of illustration.
Figure 9:
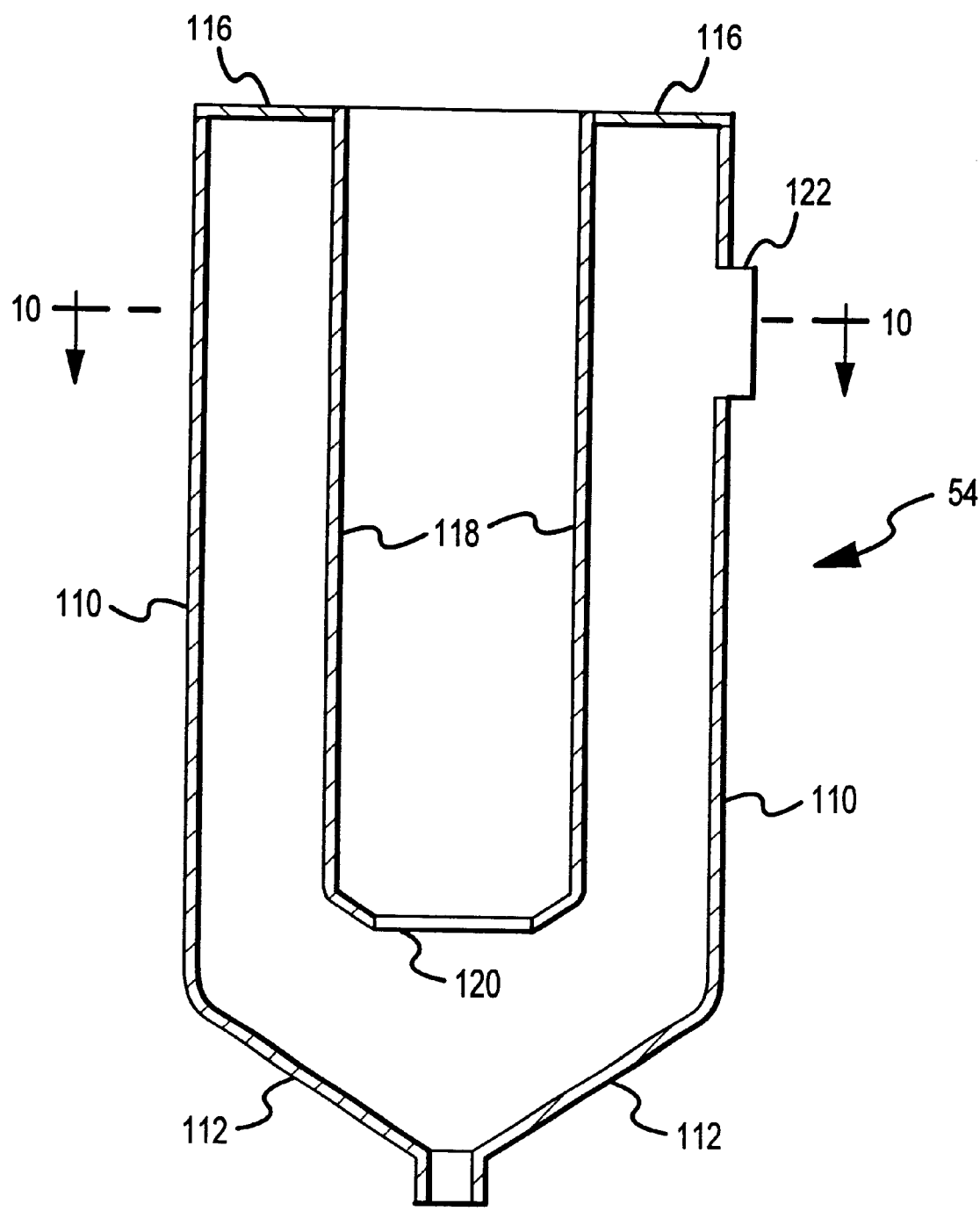
FIG. 9 is axially-sectioned side elevation view of a cyclone of the dewatering module shown in FIG. 8.
Figure 10:
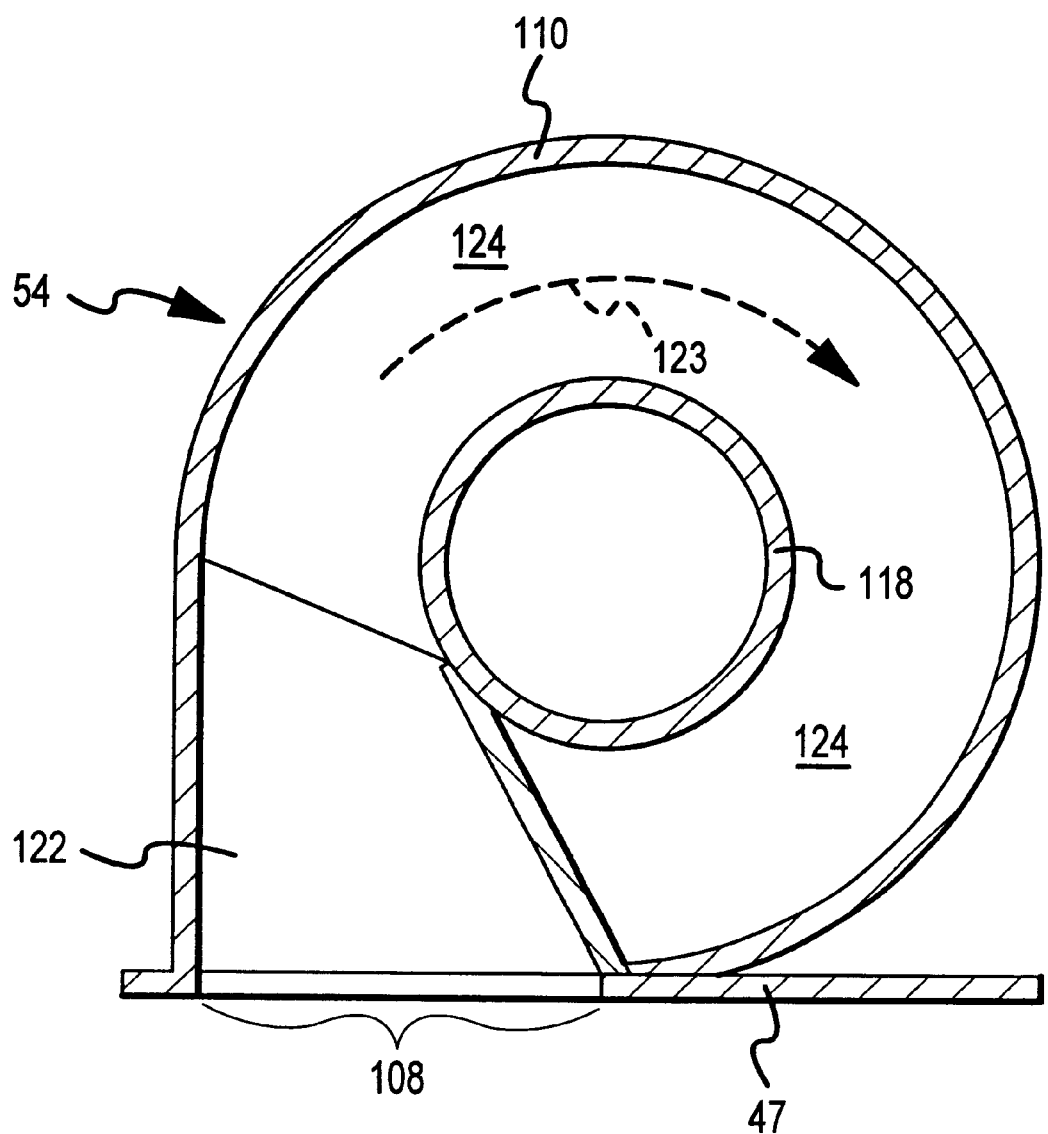
FIG. 10 is a cross-sectional view of the cyclone shown in FIG. 9, taken substantially in the plane of line 10—10.

A generally rectangular inlet duct 122 is connected to the rectangular hole 108 formed in the partition 47. The inlet duct 122 extends from the hole 108 in the partition 47 into the sidewall 110 near the top of the cyclone 54. The cross-sectional size of the inlet duct decreases slightly at the location where it joins the sidewall 110, as shown in FIGS. 8 and 10, thus causing the airflow rate to increase as the air enters the cyclone 54. As shown in FIG. 10, the inlet duct 122 joins the cylindrical sidewall 110 tangentially, causing the accelerating airflow entering the cyclone to initiate a circular swirling motion along the inside of the cylindrical sidewall 110 as shown by the flow arrow 123. A cyclonic whirling motion of the airflow is created in the direction of arrow 123 within the cylindrical sidewall 110 in an annular space 124 defined by the inner surface of the sidewall 110 and the outer surface of the air exit conduit 118.

The downward spiraling airflow in the annular space 124 experiences centrifugal force as a result of following the curved path of the sidewall 110. A common airflow velocity for air flowing through the blower 30 (FIG. 1) may be about 1500 to 3200 linear feet per minute. The cyclone 54 will greatly increase (e.g. double) this linear velocity. The whirling air enters the open lower end 120 of the air exit conduit 118 after it has made multiple circuits around the sidewall 110 and flows up through the conduit 118 and exits from the cyclone at the open end of the conduit 118 at the top end 116.

The cyclonic whirling motion of the air in the annual space 124 causes the water mist particles in the air exiting from the scrubbing module 40 to be forced under centrifugal force onto the inner surface of the cylindrical sidewall 110. The centrifugal force causes the small mist particles to coalesce into larger droplets. The droplets collect on and drain down the sidewall 110 into the conical bottom end portion 112 and from there into the water exit conduit 55. Some of any particles of contaminants that remain in the air after the water scrubbing process are also forced to the inner surface of the cylindrical sidewall 110, where those particles become entrained in the water and collected in the droplets which flow down and out of the cyclone 54. Thus, although the primary purpose of the cyclone is to remove water from the air which exits the scrubbing module 40, the cyclone also achieves a level of contaminant removal as well. As shown in FIG. 3, the water exit conduit 55 is connected to drain into the well collection area 53, allowing the collected water to be reused in the scrubbing module 40, in the manner previously described.

The dewatering capability of the cyclone 54 is a significant improvement over previous scrubbers which generally have limited capabilities to remove moisture from liquid scrubbers. In general, previous scrubbers depend on meshes, perforated plates and slam walls to attempt to remove moisture from the water exiting the scrubber. These devices are usually of limited effectiveness, and as a result, the down stream filters are more easily clogged by the heavy moisture content. The filters must be serviced more often. Furthermore, previous scrubbers have had to rely primarily on the contaminant removing capability of the filters. The present scrubber 20, however, obtains the enhanced contaminant removal capability of the baffle structure 50 and the cyclone 54 for improved airflow cleaning performance.

A curved air deflection baffle 126 is positioned above the open upper end of the conduit 118 (FIGS. 3 and 8), and directs the air exiting the conduit 118 from the top of the cyclone 54 over and down to the side of the cyclone 54 within the dewatering compartment 43 (FIG. 3). The curved air deflection baffle 126 maintains the kinetic energy of the airflow exiting the cyclone 54, without dissipating that airflow energy by causing the airflow to directly impact the sidewalls of the scrubber housing. The air deflection baffle 126 assists in directing the air throughout the compartment 43 where it diffuses through the diffusers 48. Various braces 128 (FIG. 8), the partition 47 and the scrubber frame structure 49 (FIGS. 2 and 3) support for the cyclone 54 and its components and the air deflection baffle 126 within the scrubber housing 46.

Details of the filtering module 44 are shown in FIGS. 2 and 3. The decontaminated and dewatered air exiting from the cyclone 54 is guided by the curved deflection baffle 126 from the top of the cyclone into the air diffusing portion of the dewatering compartment 43, and from there through diffusion plates 48 and mist eliminators 56 of the filtering module 44 which are mounted on the support frame structure 59. Also connected to the support 59 downstream of the diffusion plates 48 and mist eliminators 56 are one or more pre-filters 61 and one or more conventional HEPA, DOP or BAG filters 57. The airflow continues from the diffusion plates 48 and mist eliminators 56 through the filters 61 and 57 in the filtering compartment 45 and then to optional "carbon" filters 65 before passing out of an opening in the scrubber housing 46 into the duct work 38 connecting the scrubber 20 to the blower 30 (FIG. 1).

The mist eliminators 56 function primarily as a fine de-mister to remove any residual amounts of water contained in the airflow exiting the dewatering module 42. The mist eliminators 56 are preferably conventional, using a fine mesh screen which removes the airborne water mist prior to passing the air through the filters 57. Any remaining mist in the air that collects on the diffusion plates 48 or mist eliminators 56 or any of the housing sidewalls of the space inside of the dewatering compartment 43 will drain down to a sloped drain surface 130 (FIGS. 2 and 3) within the dewatering compartment 43 and from there into the drain well 53, where it may be recirculated for use in the scrubbing module 40. The pre-filters 61 are relatively low efficiency (25–40%) filters that are about two inches thick and made of porous fibers such as fiberglass fibers for merely removing any remaining large particles in order to protect the high efficiency filters 57 from unnecessary contamination. The high efficiency filters 57 are effective in removing very small contaminants and those which have resisted removal in the scrubbing and dewatering modules. The useful lifetime of the high-efficiency filters 57 may be doubled by the overall cleaning system shown herein. The "carbon" filters 65 are odor and chemical removing filters, such as potassium permanganate filters. The use of the term "carbon" used to describe these filters 65 is a generic term for odor and chemical vapor removing filters, which may or may not included elemental carbon.

By the time the air has passed through the filters 57, the scrubber 20 will have typically removed about 98% of the contaminants from the air, substantially better than the typical 40–60% of previous scrubbers and substantially better than the typical 40% efficiency of filtering devices presently used in restaurant cooking exhaust applications. Of the total amount of the removed contaminants, the baffle structure 50 described herein will typically remove about 85%, considerably better than the one third to one half removed by previous scrubbers. The cyclone 54 of the dewatering module 42 will typically remove about an additional 10%, and the mist eliminators 56, pre-filters 61, high efficiency filters 57 and carbon filters 65 will remove about 5%. The baffle-defining structure 50 will typically remove almost all of the particles having a diameter greater than or equal to five (5) microns in addition to some smaller particles, while the dewatering module 42 may remove almost all of the remaining particles greater than or equal to two (2) microns.

Molecular material, or gaseous substances, may require that appropriate chemical emulsifiers or attractants be added to the water, or that the water be replaced entirely with a cleaning liquid agent, to chemically react with the airborne contaminants to capture and remove the contaminants and/or to convert the contaminants into a harmless substance. Thus, the liquid flowing through the water scrubber may be any appropriate liquid or liquid mixture determined by the particular content of the contaminants.

In contrast to certain previous scrubbers where the filters become the primary media for cleaning the air, because of the ineffectiveness of the water scrubbing action, the filters 57 of the scrubber 20 do not have to be replaced or cleaned as often. The filters in previous scrubbers had to be removed and cleaned on a repetitive basis, in order for certain previous scrubbers to maintain an acceptable level of effectiveness in removing contaminants, thereby increasing the costs and maintenance associated with such previous scrubbers.

As an example of the effectiveness of the present invention, a fast-food hamburger restaurant may cook about a thousand pounds of hamburger meat, which could produce about ten pounds of airborne grease particles, over a twelve hour time period. After passing through the scrubber of the present invention, using water (and sometimes emulsifiers) as the cleaning liquid, the total amount of grease particles released to the environment may be reduced to about six ounces. Almost 98% of the grease may be removed, with about 85% of the total removed in the scrubbing module 40, about another 10% removed in the dewatering module 42, and the remaining approximately 5% left to the filtering module 44. Certain previous scrubbers used in the same manner will typically remove a total of only about 70% of the grease, with over half having to be removed by the expensive filters. Up to about 90% of the simple odors from restaurant cooking exhaust may be removed with just water (and sometimes emulsifiers) as a cleaning liquid, thereby eliminating or reducing the need for expensive "carbon" or potassium permanganate filters which have been used previously to control odors. In those circumstances where the "carbon" filters are employed, their useful lifetime is substantially extended as a result to the present invention.

In the larger scale example of a petroleum refinery that passes 100,000 cubic feet of air per minute, as much as four pounds of airborne ethanol may be produced per hour. The scrubber of the present invention will reduce the amount of ethanol released to the environment to only about two ounces per hour.

Figure 11:
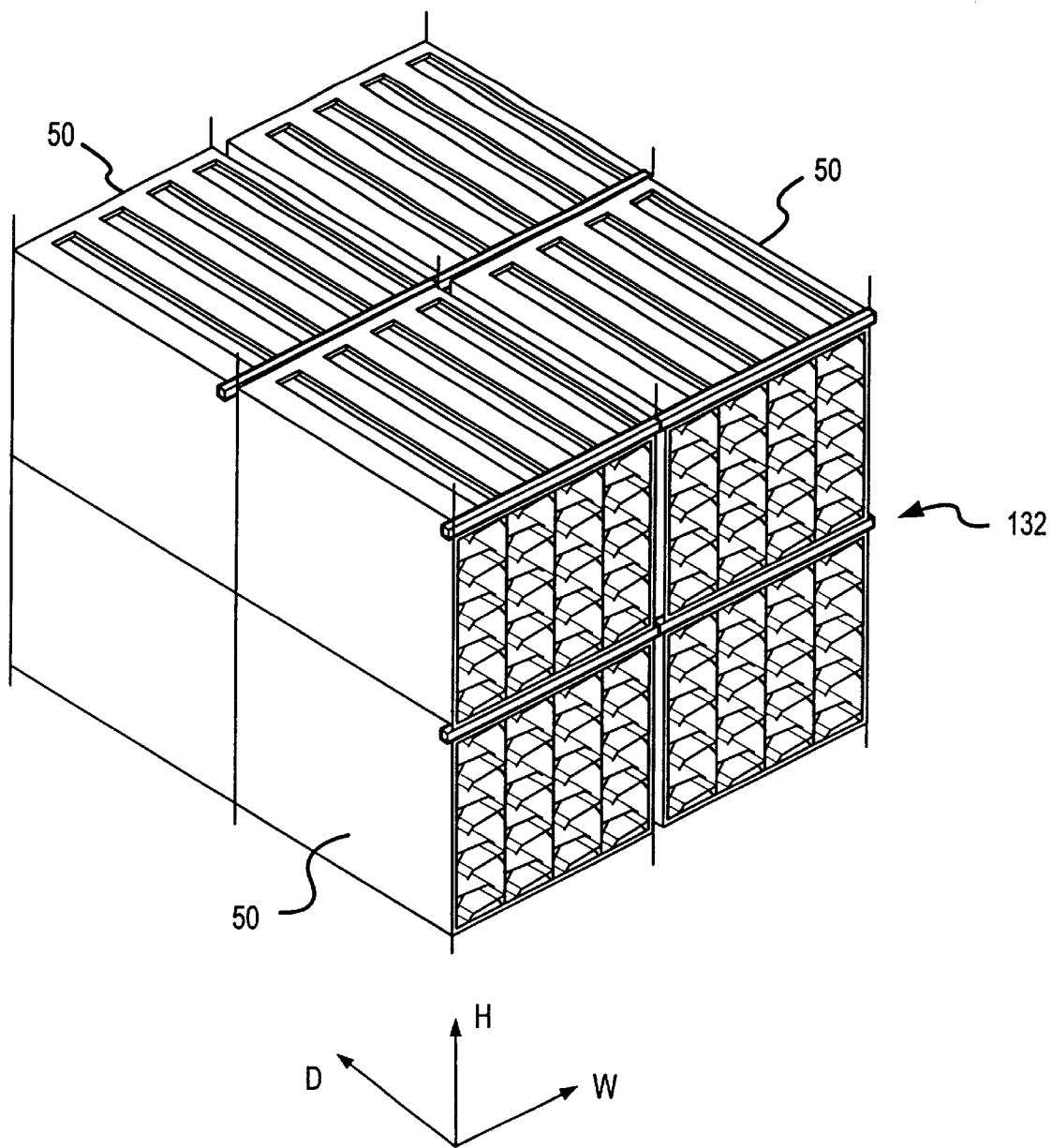
FIG. 11 is a perspective view of a plurality of baffle-defining structures positioned in multiples in height, width and depth dimensions to make up an enlarged scrubbing module of the scrubber in FIG. 1.

The volumetric capacity of the scrubber 20 may be adjusted to accommodate various different requirements for airflow volumes and contaminant concentrations. The baffle-defining structure 50 is preferably made in modularized form, allowing multiple baffle structures 50 to be organized into a larger baffle-defining collection 132 formed by placing individual baffle structures 50 side-by-side in a width dimension W shown in FIG. 11, on top of one in a height dimension H (FIG. 11), and end to end in a depth dimension D (FIG. 11) to create more, longer and wider airflow passageways, respectively. Increasing the number, length and width of the passageways 51 by increasing the number of baffle-defining structures 50 may require a change in the size of the housing 46 (FIG. 1). The housing and its internal frame are formed with rails and projections (not shown) which allow the baffle-defining structures 50 to be conveniently inserted into the housing and removed from it, once side panels of the housing are removed.

The scrubber 20 may include more than one dewatering module 42, or more than one cyclone 54 in each dewatering module, arranged in parallel in the airflow path. The number of cyclones and dewatering modules is adjusted according to the volumetric capacity of the scrubber. Similarly, more than one scrubber 20 may be arranged in parallel or in series, according to the application. Arranged in parallel, the scrubbers increases the volumetric capacity. Arranged in series, each scrubber receives and further cleans the air from the previous scrubber. In any case, the number and capacity of the scrubbers are adjusted to pass the contaminated air or gas through as much of a cleaning agent liquid environment as is needed to clean the air adequately for a given application. The scrubber 20 may also be formed a vertical unit, wherein the modules 40, 42 and 44 are stacked vertically; or the scrubber 20 may be modular, wherein each of the modules 40, 42 and 44 are separate units that can be connected together.

The control system of the scrubber 20 preferably includes a computer-controlled control system. The control system includes a plurality of sensors located at selected points in the airflow through the scrubber 20 for monitoring the contaminant removal, water level and dewatering functions. Further sensors are connected to various active elements of the scrubber to control the operation of the scrubber for desired performance conditions. For example, the control system monitors the airflow rate or speed in order to determine whether the blower 30 (FIG. 1) is functioning properly, or the airflow path has become obstructed, or the speed of the blower needs adjusted. The control system also monitors the amount of water in the baffle-defining structure 50 to determine whether the amount of water flowing through and confined within the mixing zones (86, FIG. 5 and 104, FIG. 7) of the baffle structure is at the desired level. If not, the speed or performance of the pump 62 (FIG. 3) is adjusted. To control the amount of water suspended in the mixing zones, an infrared (IR) source/detector (not shown) is mounted within an air passageway 51 of the baffle structure 50 to detect the amount of water therein. The control system also monitors the water level in the drain well 53 and delivers additional water when needed through the water supply pipe 70 by controlling the valve 69 (FIG. 3). The control system also monitors the amount of contamination in diffusion plates 48, the mist eliminators 56 and the filters 57 to determine when to replace or clean these elements and to signal that these elements need servicing. The control system controls valves to periodically drain the contaminated water from the drain well 53 and to refresh the well 53 with clean water, as well as to wash out the scrubbing module 40 and cyclone 54.

The scrubber described above provides several improvements and advantages over previous scrubbers, including: high efficiency in water scrubbing the contaminants from the airflow by the enhanced air/water mixing conditions created by the baffle-defining structures 50, high efficiency in removing the mist from the cleaned air by the centrifugal force from the cyclone dewatering module, more reliability and lower maintenance from not requiring as frequent replacement of the filters arising from the enhanced action of the scrubber and dewatering modules, relatively straightforward construction, less frequent maintenance and scalability to accommodate many different environments. Many other advantages and improvements will be apparent to those having skill in the art, after gaining a complete understanding and comprehension of the present invention.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiment set forth above.

The invention claimed is:

1. A scrubber for removing contaminants from a gas flow passing through the scrubber, comprising:
   a baffle-defining structure comprising a plurality of vertically spaced and interdigitated deflection plates which define a serpentine-shaped flow passageway through which contaminated gas flows generally upward; and
   a liquid distributor positioned above each passageway of the baffle-defining structure to flow liquid cleaning agent downward through each passageway and generally onto the deflection plates;
   the baffle-defining structure further comprising a plurality of vertically spaced deflection plates extending generally horizontally in the passageway, each deflection plate having a main portion sloping downward and an outer end lip portion extending from the main portion, vertically adjacent and consecutive deflection plates in the passageway extending in opposite directions with respect to one another, the vertically spaced deflection plates interdigitating with one another, and the lip portions horizontally overlapping the main portion of at least one vertically adjacent deflection plate to form the passageway in a serpentine manner having repeated alternating-direction turns around the lip portions of the deflection plates;
   the liquid flows off the lip portion of each deflection plate into and through the gas flow turning around the lip portion to mix the gas and the liquid and entrain contaminants in the gas flow with the liquid.

2. A scrubber as defined in claim 1 wherein:
   the vertically adjacent deflection plates overlap one another within the range of approximately 51% to 80% of the horizontal extent of each deflection plate.

3. A scrubber as defined in claim 1 wherein:
   the main portion of each deflection plate slopes downward with respect to the horizontal at a first predetermined angle, and the lip portion slopes downward with respect to the horizontal at a second predetermined angle, and the second angle is greater than the first angle.

4. A scrubber as defined in claim 3 wherein:

the first angle is within the range of approximately 15 to 45 degrees; and the second angle is greater than 45 degrees.

5. A scrubber as defined in claim 1 wherein:

the main portion of each deflection plate slopes downward with respect to the horizontal at a first predetermined angle, and the lip portion extends outward from the main portion at a second predetermined angle with respect to the horizontal, and the second angle is less than the first angle.

6. A scrubber as defined in claim 5 wherein:

the first angle is greater than approximately 45 degrees.

7. A scrubber as defined in claim 5 wherein:

the second angle is approximately 0 degrees.

8. A scrubber as defined in claim 1 wherein:

the angle of each lip portion relative to the gas flow around each lip portion causes at least a portion of the liquid flowing from the lip portion of the deflection plate to be driven upward from the lip portion with the gas flow and mixed with the gas.

9. A scrubber as defined in claim 2 wherein:

the main portion of the immediately below-positioned deflection plate and the immediately above-positioned deflection plate define a gas/liquid mixing zone in the passageway between vertically adjacent deflection plates;

the angle of each lip portion relative to the gas flow around each lip portion causes at least a portion of the liquid flowing from the lip portion of the deflection plate to be driven upward from the lip portion with the gas flow and mixed with the gas in the mixing zone; and the lip portion of each deflection plate extends into the gas flow to create a vortex motion of gas flow in the mixing zone to increase the contact of the contaminants with the liquid.

10. A scrubber as defined in claim 9 wherein:

the baffle-defining structure further comprises a pair of sidewall plates extending generally vertically on each side of each passageway;

the main portion of each deflection plate is connected to the sidewall; and the lip portion of each deflection plate is spaced from the sidewall to which the deflection plate is not connected;

each deflection plate further includes a support bracket connected to and extending between the sidewall plate and the main portion; and the main portion of the immediately below-positioned deflection plate and support bracket of the immediately above-positioned deflect plate define the mixing zone in the passageway between vertically adjacent deflection brackets.

11. A scrubber as defined in claim 10 wherein:

the lip portion of the immediately above-positioned deflection plate deflects at least a portion of gas flow toward the mixing zone to maintain the vortex motion.

12. A scrubber as defined in claim 10 wherein:

an outer end segment of the main portion of the immediately above-positioned deflection plate deflects at least a portion of gas flow toward the mixing zone to maintain the vortex motion.

13. A scrubber as defined in claim 10 wherein:

the support bracket of an immediately above-positioned deflection plate extends at approximately the same angle as the lip portion of the immediately below-positioned deflection plate.

14. A scrubber as defined in claim 13 wherein:

the mixing zone is located partially below the downward sloping main portion and partially below the support bracket.

15. A scrubber as defined in claim 10 wherein:

the main portion includes an upper portion connected to the sidewall plate and extending downward at a first predetermined angle with respect to the horizontal, a middle portion connected to the upper portion and extending downward at a second predetermined angle with respect to the horizontal, and the lip portion connects to the middle portion and extends therefrom at a third predetermined angle with respect to the horizontal;

the support bracket includes an outer portion connected to the sidewall plate below the upper portion and extending toward the middle portion at a fourth predetermined angle with respect to the horizontal, and an outer portion connected between the inner portion and the middle portion and extending at a fifth predetermined angle with respect to the horizontal;

the first angle is finite;

the second angle is greater than the first angle; and the third angle is less than the first angle.

16. A scrubber as defined in claim 15 wherein:

the fourth and second angles are approximately equal; and the third and fifth angles are approximately equal.

17. A scrubber as defined in claim 16 wherein:

the third and fifth angles are approximately 0 degrees.

18. A scrubber as defined in claim 1 further comprising:

a liquid removal device connected to receive the gas flow from the baffle-defining structure, the gas flow from the baffle-defining structure containing a mist of the liquid, the liquid removal device removing a substantial majority of the liquid mist from the gas flow.

19. A scrubber as defined in claim 18 wherein the liquid removal device comprises a cyclone.

20. A scrubber as defined in claim 19 wherein the baffle-defining structure and the cyclone are connected to clean a cooking exhaust from a restaurant.

21. A scrubber as defined in claim 19 wherein the cyclone further comprises:

a housing including a generally cylindrical sidewall within which the gas flow whirls around in a circular motion to force the liquid mist to coalesce into liquid and drain downward along the sidewall.

22. A scrubber as defined in claim 21 wherein contaminants in the gas flow whirling around are also forced to the sidewall to become entrained in the liquid on the sidewall.

23. A scrubber as defined in claim 21 wherein the cyclone further includes:

an inlet through which the gas flow enters the cyclone in a direction substantially tangentially to the cylindrical sidewall;

an end portion of the housing;

a liquid removal outlet connected in the end portion of the housing;

an exit conduit positioned coaxially with and extending substantially throughout the housing, the whirling circular motion occurring in a space between the sidewall and the exit conduit, the exit conduit including a first end located adjacent to the end portion of the housing and a second end exterior of the housing, the gas flow from the cyclone entering the first end of the exit conduit and exiting from the cyclone at the second end of the exit conduit.

24. A scrubber as defined in claim 19 further comprising a demisting wall positioned in the gas flow between the baffle-defining structure and the cyclone to remove a part of the liquid mist in the air flow from the baffle-defining structure.

25. A scrubber as defined in claim 19 further comprising:
    a filter device connected to receive the gas flow from which the liquid removal device has removed the substantial majority of the liquid; and wherein:
    the filter device comprises one of a HEPA, DOP, BAG, or carbon filter.

26. A scrubber as defined in claim 25 wherein the device comprises a plurality of filters.

27. A scrubber as defined in claim 18 wherein the baffle-defining structure and the liquid removal device are connected to clean a cooking exhaust of a restaurant.

28. A scrubber as defined in claim 1 further comprising:
    a plurality of baffle-defining structures connected together.

29. A scrubber for removing contaminants from a gas flow passing through the scrubber, comprising:
    a scrubber module having a flow passageway through which contaminated gas flows generally upward and through which a liquid cleaning agent flows generally downward by which to entrain contaminants from the gas flow within the liquid; and
    a cyclone connected to receive the gas flow from the scrubber module, the gas flow from the scrubber module containing a mist of the liquid, the cyclone centrifugally removing liquid from the air flow.

30. A scrubber as defined in claim 29 wherein the scrubber module and the cyclone are connected to clean a cooking exhaust of a restaurant.

31. A scrubber as defined in claim 29 wherein the cyclone whirls the gas flow in a circular motion to force the liquid mist to coalesce into liquid.

32. A scrubber as defined in claim 31 wherein contaminants in the gas flow whirling in the circular motion are forced to become entrained in the liquid coalesced in the cyclone.

33. A scrubber as defined in claim 32 further comprising:
    a filter module including at least one of a HEPA, DOP, BAG, or carbon filter connected to receive the gas flow from the cyclone.

34. A method for liquid scrubbing contaminants from a gas flow containing contaminants flowing generally upward through a passageway while flowing a cleaning agent liquid generally downward through the passageway, comprising the steps of:
    turning the gas flow in the passageway through a serpentine-shaped flow path around exterior lip portions of overlapping deflection plates located in the passageway;
    flowing the liquid generally off of the lip portions of the deflecting plates;
    mixing the liquid flowing off of the lip portions in the gas flow turning around the lip portions; and
    entraining a substantial portion of the contaminants in the liquid.

35. A method as defined in claim 34 comprising the further step of:
    lifting liquid upward from the lip portion during mixing with the gas flow turning around the lip portions of the deflection plates.

36. A method as defined in claim 34 comprising the further steps of:
    lifting liquid upward from the lip portion during mixing with the gas flow into a gas/liquid mixing zone between vertically adjacent deflection plates; and
    flowing the gas flow in the mixing zone in a vortex motion to increase contact of the contaminants with the liquid.

37. A method as defined in claim 36 comprising the further step of:
    inducing the vortex motion by deflecting a portion of the gas flow in the passageway with the portion of the deflection plate.

38. A method as defined in claim 36 comprising the further step of:
    deflecting a portion of the gas flow into the vortex motion at the mixing zone from a portion of each deflection plate adjacent to the lip portion.

39. A method as defined in claim 34 comprising the further step of:
    removing a substantial majority of a liquid mist from the gas flow after the gas flow flows through the serpentine-shaped passageway.

40. A method as defined in claim 39 wherein the removing step comprising the further steps of:
    whirling the gas flow in a circular motion to force the liquid mist to coalesce into liquid by centrifugal force; and
    removing the coalesced liquid from the air flow.

41. A method as defined in claim 40 comprising the further step of:
    forcing contaminants in the gas flow into the coalesced liquid while whirling the gas flow in the circular motion to entrain additional contaminants in the coalesced liquid.

42. A method for removing contaminants from a gas flow comprising the steps of:
    flowing a gas containing contaminants generally upward through a flow passageway;
    flowing a cleaning agent liquid generally downward through the passageway to entrain contaminants from the gas flow in the liquid; and
    removing a liquid mist remaining in the gas flow exiting from the passageway by centrifugal force.

43. A method as defined in claim 42 comprising the further step of:
    whirling the gas flow in a circular motion to centrifugally force the liquid mist to coalesce into liquid.

44. A method as defined in claim 43 comprising the further step of:
    forcing contaminants in the gas flow into the coalesced liquid while whirling the gas flow in the circular motion.

45. A method as defined in claim 42 wherein the gas flow is a cooking exhaust from a restaurant.

* * * * *